F. VIRGILI.
BAKING WITH QUICK HEATING AND COOLING
APPLICATION FILED JAN. 19, 1907.

970,862.

Patented Sept. 20, 1910.

3 SHEETS—SHEET 1.

WITNESSES:
W. M. Avery
J. O. Davis

INVENTOR
Felicissimo Virgili
BY
Munn & Co
ATTORNEYS

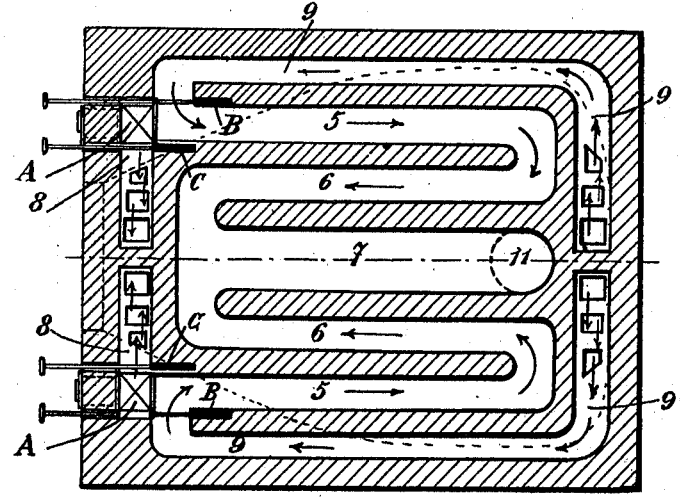
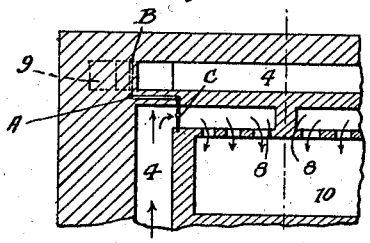
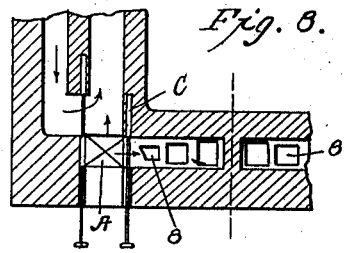
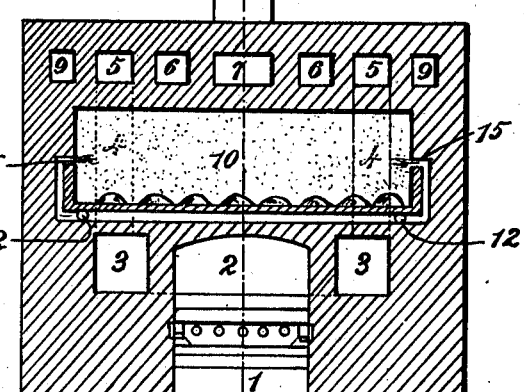

F. VIRGILI.
BAKING WITH QUICK HEATING AND COOLING.
APPLICATION FILED JAN. 19, 1907.

970,862.

Patented Sept. 20, 1910.

3 SHEETS—SHEET 3.

WITNESSES
W. M. Avery
J. P. Davis

INVENTOR
Felicissimo Virgili
BY
Munn & Co
ATTORNEYS

UNITED STATES PATENT OFFICE.

FELICISSIMO VIRGILI, OF GENOA, ITALY, ASSIGNOR TO SOCIETÀ ANONIMA PER GRIGLIE E FORNI VIRGILI, OF GENOA, ITALY.

BAKING WITH QUICK HEATING AND COOLING.

970,862.   Specification of Letters Patent.   Patented Sept. 20, 1910.

Application filed January 19, 1907. Serial No. 353,042.

*To all whom it may concern:*

Be it known that I, FELICISSIMO VIRGILI, subject of the King of Italy, resident of Genoa, Italy, have invented certain new and useful Improvements in or Relating to Baking with Quick Heating and Cooling, of which the following is a specification.

This invention relates to a furnace for baking bread and other alimentary substances, with an external combustion chamber, that is to say, with a combustion chamber placed outside the baking chamber having all the advantages of furnaces with inner combustion chambers in which the heating is effected by lighting the fire in the baking chamber itself.

This invention enables the baking chamber to be heated uniformly, the products of combustion heating the chamber from below and above, and it further permits of heating said chamber quickly when desired, by causing the products of combustion, after heating the chamber from below, to traverse the chamber, before passing above the same, to rapidly increase its internal temperature.

This invention also enables the baking chamber to be quickly cooled without stopping the furnace.

A construction according to this invention is illustrated, by way of example, in the accompanying drawings, in which:—

Figure 1:
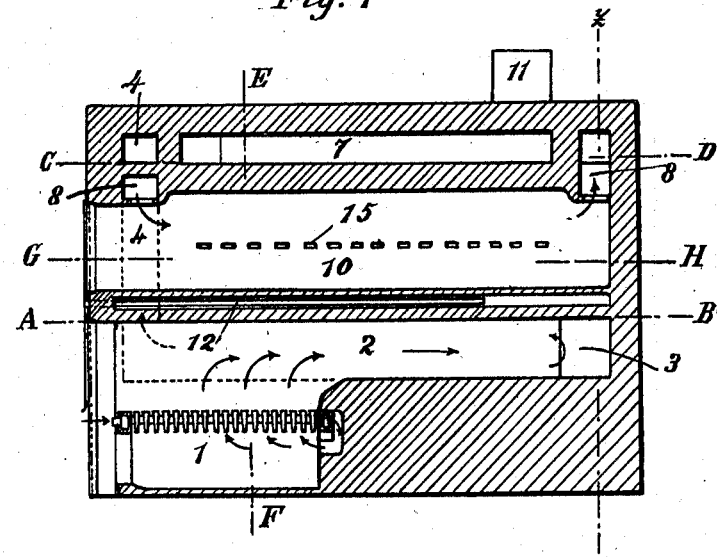
Figure 2:
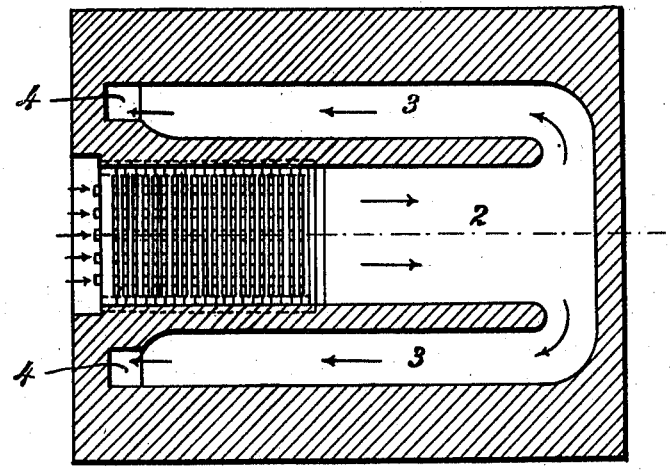
Figure 9:
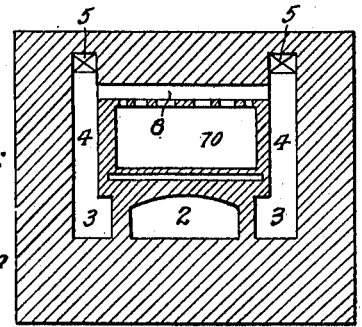
Figure 5:
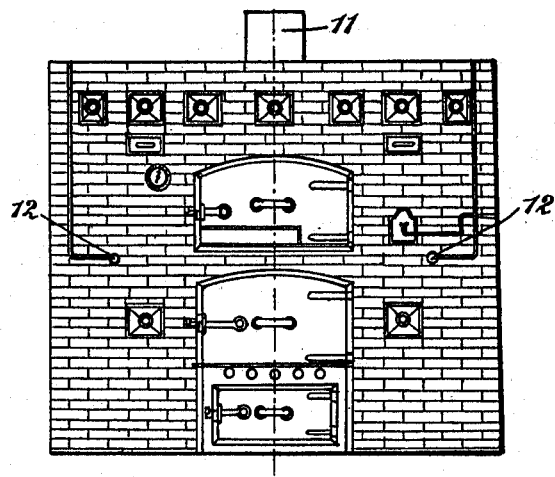
Figure 6:
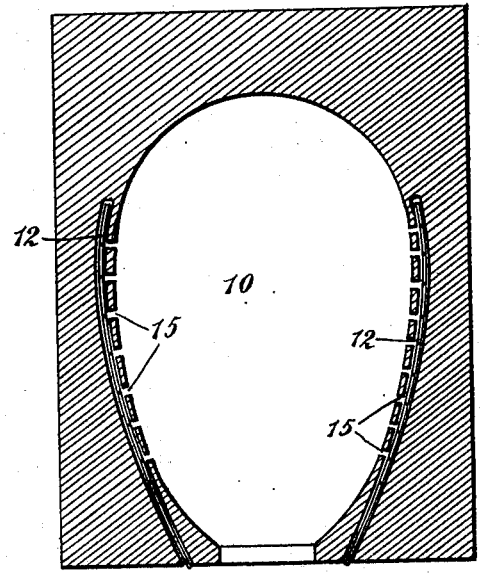

Figure 1 is a longitudinal section of the furnace, Fig. 2 a horizontal cross-section on line A—B of Fig. 1, Fig. 3 another horizontal cross-section on line C—D of Fig. 1, Fig. 4 a cross-section on line E—F of Fig. 1, Fig. 5 a front elevation of the furnace, Fig. 6 a plan on line G—H of Fig. 1, Figs. 7 and 8 detail views in section and in plan of the furnace, Fig. 9 is a vertical transverse section on the line z—z of Fig. 1, the view being on a reduced scale.

A furnace according to this invention may comprise a single baking chamber, but it is obvious that it could be built with two or three superposed chambers separated by flues for the passage of the products of combustion. It will also be understood that the furnace could work with baking chambers arranged side by side, by dividing the said baking chamber into two. In that case, simply by manipulating the dampers corresponding to one of the two divisions, it would be possible to have two baking chambers at temperatures differing from each other, and suitable for simultaneously baking products requiring different temperatures.

The products of combustion pass from the grate into the chamber 2, whence they enter into lateral flues 3 to rise through normally open flues 4. In Fig. 3 the said flues are closed by horizontal dampers A. From the flues 4, the products of combustion, finding the damper B closed (which in Fig. 3 is open), pass through symmetrically arranged flues 5 and 6 and from the latter to the central flue 7 and thence into the chimney 11. In their passage, the combustion gases come, therefore, into contact with the baking chamber 10 both at the top and at the bottom.

After heating the bottom portion of the baking chamber, the products of combustion pass into its upper portion, rising through the flues 4 arranged in the front portion of the furnace. This arrangement is very important, for it enables uniform baking to be obtained at all points, since while the back portion of the furnace keeps the heat better, the front portion is more liable to cool, owing to its neighborhood to the mouth of the furnace; the vertical flues 4 obviate by their position these drawbacks.

If it be desired to heat the baking chamber quickly, it is sufficient to close the flues 4 by means of dampers A, and to open at the same time the dampers B controlled by the same rod, and also to open the dampers C. The hot gases, instead of passing through the flues 5, escape through the lateral flues 8 arranged at the front portion of the baking chamber, and from these latter, through the various openings (shown in section and plan in Figs. 7 and 8), they pass into the baking chamber and through the said chamber, and thence into the flues 9 starting from the back portion of the baking chamber. To the latter flues, the gases pass through the various openings, shown in plan in Fig. 3, in order to pass from the back portion of the baking chamber where the flues are arranged symmetrically to those of the front portion. From the latter flues, the gases, finding the damper B open, pass into the chimney through the flues 5, 6 and 7. In this way, the walls of the baking chamber, instead of being slowly heated by the heat radiating through the walls of the same, are strongly heated, and in a very short time, owing to their direct contact with the combustion gases. If it be desired to cool the furnace quickly, the damper C is closed, and the damper B opened, at the time closing the flue 4 by means of the damper A. The flue 4 no longer working, the door of the mouth of the furnace is then opened, cold air passes in and is drawn through the openings made in the top of the baking chamber (Figs. 1 and 3.), and from these latter passes into the chimney through the flues 9, 5, 6 and 7. When cold air is caused to pass into the baking chamber, the valve C is closed, valve B is open, and the ascending flues 4 are closed by the valve A. Consequently the products of combustion remain in the hearth and the fire loses its activity. The heating of the lower flues being no longer increased they cool off, the heat being carried away by the current of cold air traversing the baking chamber. The flues, both above and below the baking chamber, are in coil form and are so arranged that the products of combustion before reaching the chimney pass through all of said flues thereby giving out to the furnace the maximum part of their heat.

Below the hearth or sole of the furnace is left a dead space, which extends in a circular manner up to half the height of the baking chamber, with which it communicates by means of horizontally arranged orifices 15 opening above the bread which is being baked.

Pipes 12, shown in Figs. 1, 4 and 5, serve for supplying hot water to be converted into steam, to the baking chamber, so as to glaze the bread and to prevent it from cracking. The steam escapes through orifices made in the walls of the said pipes, and passes into the baking chamber which it fills through the openings 15 made in the body of the furnace, and condenses on the bread. These openings 15 are arranged in a horizontal line at the center of the height of the baking chamber (Figs. 1, 4 and 6). These pipes, unlike in other furnaces, are arranged so that they can be put in and removed from the outside, so that they can be easily cleaned and replaced. It is obvious that they are connected to other pipes shown in the front portion of the furnace (Fig. 5) for supplying hot water.

The accompanying drawing shows a grate with smoke consuming pipes, for the purpose of preventing smoke from passing with the hot gases through the baking chamber, but it is obvious that any kind of grate or combustion chamber may be used, and any fuel whether solid, liquid or gaseous. The furnace can be made of masonry or of metal, or partly of masonry and partly of metal, or of any other suitable material.

The number and the position of the dampers and registers, the number and the arrangement of flues for combustion gases, and their connection, can be varied *ad infinitum*, without departing from the spirit of this invention, which chiefly has in view quick heating and cooling of the baking chamber.

Having now fully described my said invention and the manner in which the same is to be performed, what I claim and desire to secure by Letters Patent of the United States of America is:—

1. A furnace for the baking of bread, or other alimentary substances, comprising a baking chamber, a combustion chamber on the outside of the baking chamber, a series of flues arranged in coil shape placed below the baking chamber, a second series of flues also in coil shape above the baking chamber, and through which all the products of combustion pass, the said second series of flues communicating with the chimney, vertical flues at the front portion of the furnace for connecting the upper and lower flues, the said baking chamber being provided with openings in its top at the front, transverse flues extending above the top of the baking chamber at the front end thereof, the said flues communicating with the vertical flues and with the openings in the top of the baking chamber at the front thereof, dampers for directing the products of combustion to said transverse flues, to cause the products of combustion after having passed through all the lower flues to pass through the baking chamber, from the front to the rear thereof, transverse flues communicating with openings in the top of the baking chamber at the rear end thereof and extending in opposite directions to the sides of the furnace the said flues terminating in longitudinal flues extending forward at the sides of the furnace and communicating at their front ends with the said flues above the baking chamber, and dampers for controlling said communication whereby the products of combustion after passing through the baking chamber pass through all the higher flues to the chimney.

2. In a furnace for the baking of bread and other alimentary substances, a baking chamber, a combustion chamber, flues in coil shape arranged below the baking chamber, flues also in coil shape arranged above the baking chamber and communicating with the chimney, the baking chamber being provided with inlet openings in its top at the front thereof and outlet openings in the rear portion of the top, transverse flues extending in opposite directions above the rear portion of the top of the baking chamber and communicating with the said outlet openings of the baking chamber, the said flues terminating in longitudinal flues extending forward at the sides of the furnace, the transverse and longitudinal flues being adapted to connect the said outlet openings of the baking chamber with the flues above the baking chamber, means for closing the hearth draft to diminish the intensity of the fire, and the heat in the lower flues, and means for permitting cold air entering the mouth of the furnace to pass into the baking chamber through the said inlet openings, the air passing from the baking chamber by way of the outlet openings and then passing through all the upper flues, for the purpose described.

3. In a furnace for baking bread, or other alimentary substances, a baking chamber provided with a series of openings, at opposite sides thereof, the openings being arranged in a horizontal line at the center of the height of the baking chamber, the furnace having a dead space below the hearth, and an annular space around the baking chamber, the annular space extending upward from said dead space to half the height of the baking chamber and communicating with the said openings in the baking chamber, and pipes arranged to convey steam to the openings in the baking chamber, the steam escaping from said pipes into the baking chamber causing a circulation of the air contained in the dead space below the hearth and in the annular space around the baking chamber.

4. In a furnace for the baking of bread and other alimentary substances, a baking chamber, a combustion chamber, a series of flues arranged below the baking chamber, a second series of flues arranged above the baking chamber and communicating with the chimney, vertical flues at the front of the furnace and through which the products of combustion are adapted to pass from the lower flues to the upper flues, dampers for controlling the communication between the said vertical flues and the upper flues, the top of said baking chamber being provided at its front portion at each side of its longitudinal center with a series of inlet openings and at its rear portion with a series of outlet openings at each side of its longitudinal center, transverse flues at the top of the baking chamber at the front end and communicating with said inlet openings in the top of the baking chamber, dampers for directing the products of combustion rising in the vertical flues into said transverse flues, flues having transverse portions at the rear of the furnace above the top of the baking chamber and communicating with the outlet openings in the top of said baking chamber, the said flues having longitudinal portions extending forward at the sides of the furnace and adapted to communicate at their front ends with the said upper flues, and dampers for controlling said communication.

In testimony whereof I have affixed my signature in presence of two witnesses.

FELICISSIMO VIRGILI.

Witnesses:
H. HILINFEIRAFOE,
A. FERRARI.